United States Patent
Kawai et al.

[11] 3,927,648
[45] Dec. 23, 1975

[54] ELECTRONIC IGNITION TIMING CONTROL CIRCUIT FOR INTERNAL COMBUSTION ENGINE

[75] Inventors: Hisasi Kawai, Toyohashi; Kazuo Iwase, Okazaki, both of Japan

[73] Assignee: Nippon Soken, Inc., Nishio, Japan

[22] Filed: June 4, 1974

[21] Appl. No.: 476,272

[30] Foreign Application Priority Data
June 5, 1973  Japan .................................. 48-63471

[52] U.S. Cl. .......................... 123/117 R; 123/117 D
[51] Int. Cl.² ............................................. F02P 5/08
[58] Field of Search .................... 123/117 R, 117 D

[56] References Cited
UNITED STATES PATENTS

| | | | |
|---|---|---|---|
| 3,454,871 | 7/1969 | Nolting | 123/117 R |
| 3,738,339 | 6/1973 | Huntzinger et al. | 123/117 R |
| 3,749,073 | 7/1973 | Asplund | 123/117 R |
| 3,752,139 | 8/1973 | Asplund | 123/117 R |
| 3,757,755 | 9/1973 | Carner | 123/117 R |
| 3,871,342 | 3/1975 | Fujinami et al. | 123/117 R |

*Primary Examiner*—Charles J. Myhre
*Assistant Examiner*—Joseph Cangelosi
*Attorney, Agent, or Firm*—Cushman, Darby & Cushman

[57] ABSTRACT

There is provided a digital electronic ignition timing control circuit for an internal combustion engine wherein a retard angle from the reference angular position of the engine which corresponds to the number of revolutions of the engine and the vacuum within the engine intake manifold is read out from a predetermined program, the retard angle thus read out is converted, in terms of a frequency which varies with a predetermined functional relationship, into a delay time from the moment at which the rotation of the engine passes the reference angular position, the frequency corresponding to the delay time is counted by a counter, and the expiration of the delay time from the moment of passing the reference angular position is computed in accordance with the count of the counter to determine the timing of the ignition. Thus, the system of this invention is free from deterioration with age, capable of timing the ignition of an engine with very high accuracy, capable of readily obtaining a different ignition timing characteristic by changing the program, is requiring no complicate computing circuitry, eliminates the computing time for an electronic ignition system through the use of a digital system and hence is superior in response characteristic.

8 Claims, 10 Drawing Figures

ELECTRONIC IGNITION TIMING CONTROL CIRCUIT FOR INTERNAL COMBUSTION ENGINE

BACKGROUND OF THE INVENTION

1. Field of the Invention

The present invention relates to an electronic ignition timing control circuit for electrically timing the ignition of an internal combustion engine (hereinafter referred to as an engine).

2. Description of the Prior Art

The conventional ignition distributors widely used for timing the ignition of an engine are designed so that the relative position of the electrical contact points and cam can be varied in accordance with the number of revolutions of the engine and the strength of the intake manifold vacuum respectively detected by the centrifugal governor and the vacuum advancer to generate ignition signals at the correct moments that suit the operating conditions of the engine.

A disadvantage of the ignition distributor of the above type is that since all the controls are accomplished mechanically, it is impossible to accurately time the ignition of an engine with high reliability and moreover it is difficult to ensure the ideal ignition timing characteristic, thus making it unsuitable for exhaust emission controls of immediate necessity.

SUMMARY OF THE INVENTION

It is an object of the present invention to overcome the above-described difficulty. In accordance with the present invention, there is thus provided a digital electronic ignition timing control circuit for an internal combustion engine wherein a retard angle from the reference angular position of the engine which may for example be 50° before the top dead center and corresponding to the engine revolutions and the intake manifold vacuum is read out from a set predetermined program, the retard angle thus read out is converted, in terms of a frequency which varies with a predetermined functional relation, into a delay time from the moment at which the rotation of the engine passes the reference angular position, the frequency corresponding to the delay time is counted by a counter, and the expiration of the delay time from the moment of passing the reference angular position is computed in accordance with the count of the counter to determine the timing of the ignition, whereby ensuring freedom from deterioration with age, ability to time the ignition of an engine with very high accuracy, possibility of obtaining a different ignition timing characteristic through the change of the program, elimination of the complicate computing circuitry, elimination of the computing time for the electronic ignition system through the use of a digital system and hence an improved response characteristic.

The circuit according to the invention has among its great advantages the fact that since the output frequency of advance angle-frequency converting means for producing a frequency which varies with a predetermined functional relationship in accordance with a total amount of advance angles consisting of an advance angle determined by a preset read-only memory in accordance with the number of revolutions of the engine, an advance angle determined by a preset read-only memory in accordance with the vacuum within the engine intake manifold and an advance angle determined by a preset read-only memory in accordance with the temperature of the engine cooling water or the amount of the engine exhaust gases, is gated by a value inversely proportional to the engine revolutions and this output is counted by a counter, a different ignition timing characteristic may be obtained simply by changing the read-only memories and in this way it is possible to obtain a wide range of ignition timing characteristics and moreover, in contrast to the conventional mechanical ignition timing control systems employing the distributors, there is no possibility of deterioration with age and it is possible to time the ignition of an engine with a very high degree of accuracy.

Another great advantage of the circuit of the invention is that since all the controls are effected using digital signals, as compared with the cases where the controls are effected by means of analog signals, the circuit provides operation which is characterized with a high degree of stability against changes in the external conditions such as the power supply voltage and the ambient temperature, the control circuitry may be constructed using integrated circuits thus making it possible to reduce manufacturing costs and standardize the assembling process, and moreover the elimination of the ordinary multiplier and divider circuits assists in simplifying the circuit construction and ensuring a greater operating accuracy.

Still another great advantage is that since the output frequency of the advance angle-frequency converting means for generating a frequency which varies with a predetermined functional relationship in accordance with a total advance angle, is gated by a value inversely proportional to the number of revolutions of an engine and this output is counted by a counter, the output data of the counter represents the latest data obtained by gating the output frequency of the advance angle-frequency converting means with the value inversely proportional to the engine revolutions and a very high response speed is ensured.

DESCRIPTION OF THE PREFERRED EMBODIMENTS

The construction and operation of the electronic ignition timing control circuit according to the invention will now be described with reference to the illustrated embodiments.

Figure 1:
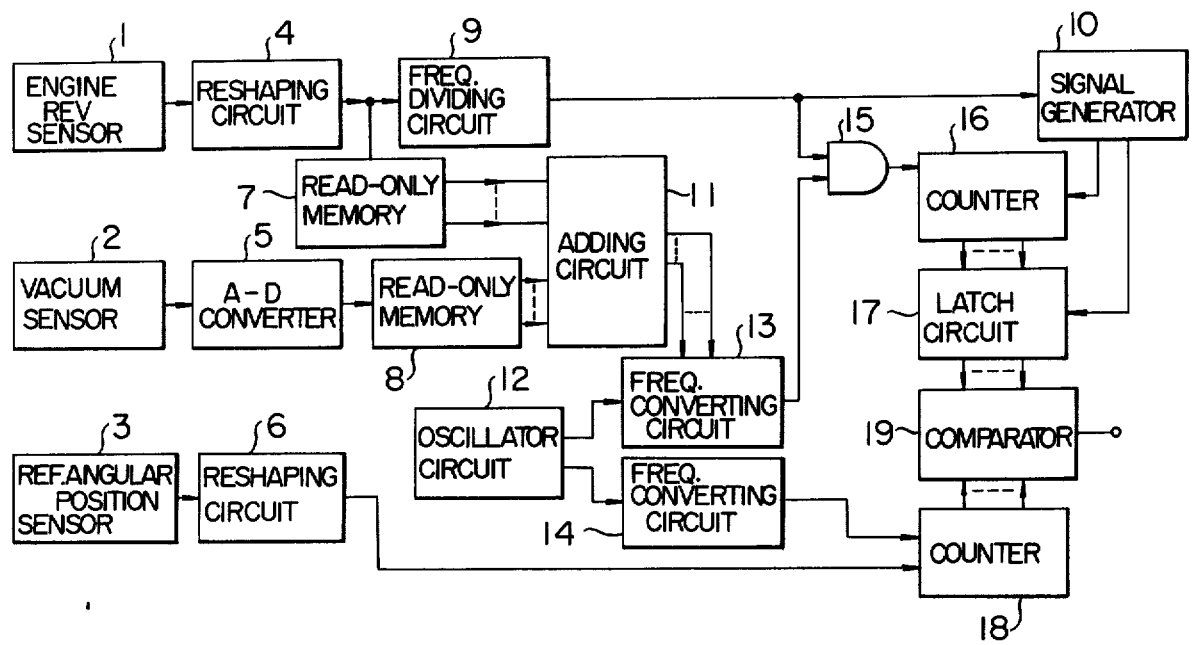
FIG. 1 is a block diagram showing a first embodiment of an electronic ignition timing control circuit according to the present invention.
Figure 2:
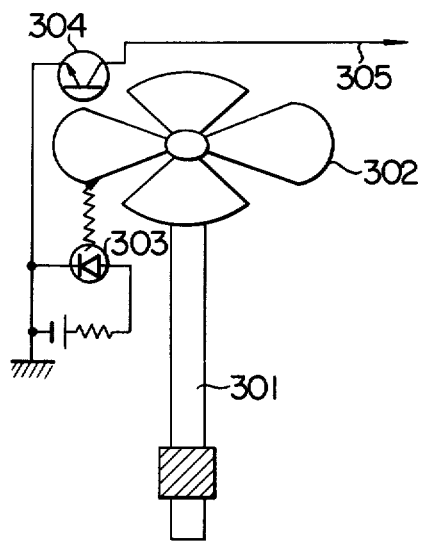
FIG. 2 is a schematic diagram showing one form of the reference angular position sensor used in the embodiment of FIG. 1.
Figure 4A:
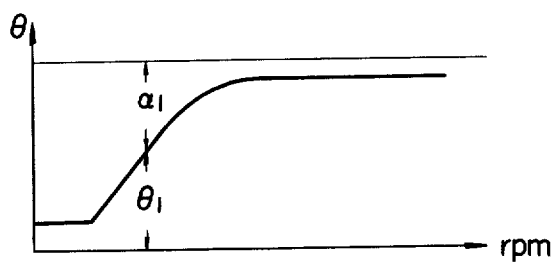
FIGS. 4a and 4b and FIGS. 5a and 5b are retard angle characteristics showing the programs stored in read-only memories 7 and 8 in the embodiment of FIG. 1.
Figure 4B:
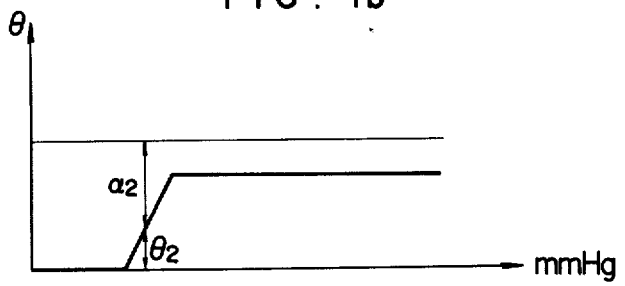
Figure 5A:
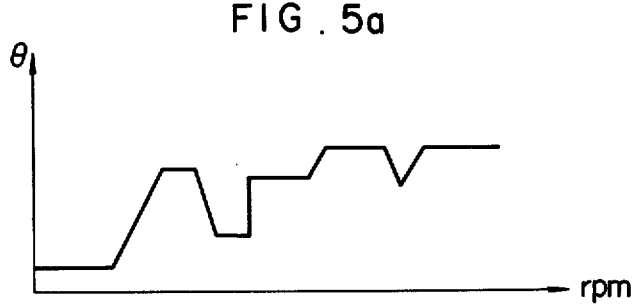
Figure 5B:
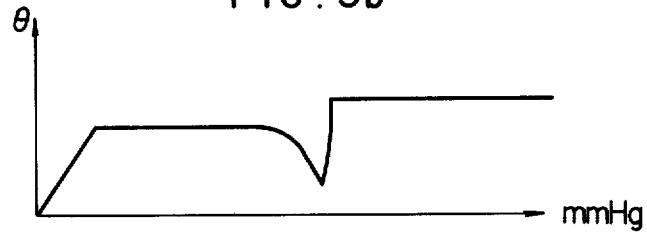

Referring first to FIG. 1 illustrating a first embodiment of the circuit according to the invention, numeral 1 designates an engine revolution sensor comprised of an electromagnetic pickup mounted to detect the number of revolutions of the engine by utilizing the engine ring gear. If the number of teeth in the ring gear is 115, the output signal of the pickup 1 has a frequency of 1,150 Hz at the engine speed of 600 rpm. Numeral 2 designates a vacuum sensor for detecting the vacuum within the engine intake manifold, which may be comprised for example of a core movable in accordance with the manifold vacuum, an oscillator for converting the movement of the core into a voltage and a differential transformer, whereby the output of the oscillator is applied to the input winding of the differential transformer and the voltage generated from the output winding of the differential transformer is smoothed by a rectifying and smoothing circuit which in turn produces a DC output voltage that varies in accordance with the movement of the core to assume a value corresponding to the detected manifold vacuum. Numeral 3 designates a reference angular position sensor for electrically detecting the reference angular position of the engine crankshaft to generate a reference angular position signal. FIG. 2 illustrates an exemplary form of the sensor 3. The sensor 3 shown in FIG. 2 is designed for use with a four cylinder engine and it comprises, in combination, light intercepting plates 302 mounted on a distributor rotor shaft 301, a light emitting diode 303 and a phototransistor 304, whereby when the light intercepting plate 302 passes between the light emitting diode 303 and the phototransistor 304, the light is intercepted by the light intercepting plate 302 so that the reference angular position is detected by an electric signal generated at an output terminal 305. Numeral 4 designates a reshaping circuit of a known type which converts the output waveform of the engine revolution sensor 1 into a rectangular wave, 5 an analog-to-digital converter (hereinafter referred to as an A - D converter) for converting the analog output waveform of the vacuum sensor 2 into a digital value, 6 a reshaping circuit of a known type for converting the output waveform of the reference angular position sensor 3 into a rectangular waveform. Numeral 7 designates an engine revolution read-only memory storing in binary code form a program of the retard angle characteristic according to the engine revolutions, that is, the retard angle characteristic shown in FIG. 4a or 5a is preliminarily programmed or entered thereinto. The engine revolution read-only memory 7 may for example be the SN 7489 manufactured by Texas Instruments, Inc. (hereinafter referred to as TI). Numeral 8 designates a vacuum read-only memory storing similarly with the read-only memory 7 a program of the retard angle characteristic according to the intake manifold vacuum in binary code form, that is, the retard angle characteristic shown in FIG. 4b or 5b is preliminarily programmed thereinto, and the vacuum read-only memory 8 may also be comprised of the TI SN7489. While not shown in the drawings, the revolution read-only memory 7 is of course operated under the control of a NAND circuit which is opened by the output signal of the reshaping circuit 4 to pass clock pulses therethrough, a counter for counting the number of clock pulses passed through the NAND circuit, a latch circuit (temporary storage circuit) for temporarily storing the count of the counter and determining the address of the revolution read-only memory 7 with its binary output code and a signal generator for generating a reset signal for the counter and a storage command signal for the latch circuit by means of the output signal from the reshaping circuit 4. Also not shown in the drawings, to determine the address of the vacuum read-only memory 8, the A - D converter 5 is comprised of a counter for counting the number of clock pulses, a latch circuit (temporary storage circuit), a signal generator for generating a counter reset signal at a predetermined period and a comparator. When the analog output of the vacuum sensor 2 corresponding to the intake manifold vacuum and the staircase output corresponding to the output of the counter are compared in the comparator so that the comparator produces an output indicating that the two inputs are equal in value, that is, when the output of the counter attains the value corresponding to the detected manifold vacuum, the output of the comparator is applied as a storage command signal to the latch circuit so that the then current output of the counter is stored in the latch circuit and thus the address of the vacuum read-only memory 8 is determined by the binary output code of the latch circuit.

Numeral 9 designates a frequency dividing circuit of a known type for dividing the output frequency of the reshaping circuit 4 and in this embodiment the frequency division by a factor of 9 is accomplished. Numeral 10 designates a signal generator for generating from the output waveform of the frequency dividing circuit 9 a reset signal for a counter 16 that will be described later and a storage command signal for a latch circuit 17 (temporary storage circuit) that will be described later. Numeral 11 designates an adding circuit for adding in parallel the output data of the revolution read-only memory 7 and the vacuum read-only memory 8 and constructed by combining for example three of the TI SN 7483 together, 12 an oscillator circuit of a known type which is in this embodiment comprised of a crystal resonator oscillated at 27 MHz, 13 a frequency converter circuit for converting the output frequency of the oscillator circuit 12 with the binary output code or data from the adding circuit 11 and chiefly comprised for example of two TI SN 7497, 14 a frequency converting circuit chiefly comprised for example of a single TI SN 7497 which differs from the frequency converter circuit 13 in that a programmed data is entered as the input data, 15 an AND circuit of a known type for performing the AND operation on the output waveform of the frequency dividing circuit 9 and the clock pulses from the frequency converting circuit 13 and applying its output to the counter 16 that will be described later. Numeral 16 designates a counter which is reset by the output signal of the signal generator 10 to count the number of the output pulses from the AND circuit 15 and which may be comprised for example of the TI SN7493, 17 a latch circuit for temporarily storing the data held by the counter 16 and comprised for example of the TI SN 54/7475, 18 a counter which is reset by the reference angular position signal pulse from the reshaping circuit 6 to count the number of the clock pulses from the frequency converting circuit 14 and which may be comprised for example of the TI SN 7493, 19 a comparator for generating an output signal when the output data of the counter 18 has a value equal to or greater than that of the output data of the latch circuit 17 and comprised for example of the TI SN 7485. The timing of the ignition is determined by the waveform of the output pulse from the comparator 19.

Figure 3:
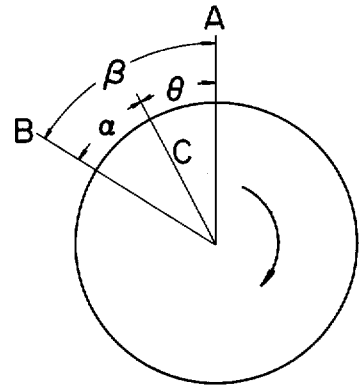
FIG. 3 is an engine revolution diagram useful in explaining the operation of the circuit according to the invention.

With the construction described above, the operation of the circuit according to the invention will now be described. The basic principle of the circuit according to the invention will be described first. For purposes of explaining the ignition timing control according to the circuit of this invention in a simplified form, FIG. 3 illustrates schematically the positions of the crankshaft rotated in a clockwise direction, and in FIG. 3 the top dead center is designated at a point A. If it is desired that the ignition is timed to occur at a point C $\theta°$ before the top dead center A, that is, if it is desired to give a $\theta°$ spark advance, the desired ignition point may be expressed in terms of a retard angle from an angle $\beta$ before the top dead center, as follows:

$$\theta = \beta - \alpha$$

Thus, by setting the reference angular position of the crankshaft at a point B which is $\beta°$ before the top dead center, the desired advance angle $\theta$ may be given in terms of the retard angle $\alpha$ from the point B. In other words, since the revolution advance angle $\theta_1$ and the intake manifold vacuum advance angle $\theta_2$ in FIGS. 4a and 4b are in additive relation, an added value $\alpha$ of the respective retard angles $\alpha_1$ and $\alpha_2$ represents the total advance angle. Since this value is representative of the number of degrees of the crankshaft rotation, in order to give this angle in terms of a retard angle from the reference angular position at the point B, it is necessary to divide the retard angle $\alpha$ by the engine revolutions at that moment and thus it may be given by the following equation (1):

$$\tau = K \times \alpha / N \qquad (1)$$

where $N$ is the number of revolutions of the engine [r.p.m.], $\tau$ is the delay time [sec.] between the occurrence of the reference angular position detecting signal and the moment of occurrence of the spark, and $K$ is the proportionality constant.

Further, since the above equation (1) holds on the assumption that the engine operates at the uniform speed during the time between the moment of measuring the engine revolutions $N$ and the moment of occurrence of the ignition signal, the above equation (1) may provide a more accurate approximation, if the number of degrees of the total retard angle $\alpha$ is reduced to a minimum and if at the same time the computation of the engine revolutions is effected in the vicinity of the reference angular position or the point B and its measuring time is reduced to a minimum. Thus, by computing the delay time $\tau$ in the manner described above and by determining the ignition timing through the comparator 19 so that the ignition occurs at a point at which the actual delay time $\tau$ from the occurrence of the reference angular position detecting signal expires, it is possible to obtain the correct ignition timing corresponding to the desired advance angle $\theta$.

Figure 6:
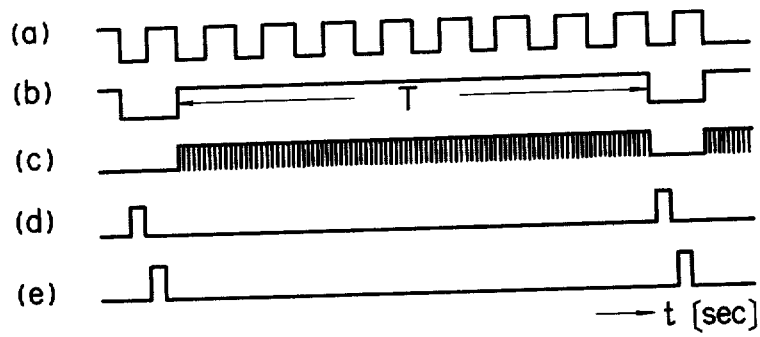
FIG. 6: a shows the output waveform of a reshaping circuit 4, b shows the output waveform of a frequency dividing circuit 9, c shows the output waveform of a gating circuit 15, d shows the latch signal waveform to a latch circuit 17 and e shows the reset signal waveform to a counter 16 in the embodiment of FIG. 1.

The operation of the embodiment shown in FIG. 1 will now be described in detail. In consideration of the fact that we obtain from the above equation (1) $\tau = K\alpha \times 1/N$, i.e., $K\alpha$ is multiplied by the reciprocal of the engine revolutions and that the engine revolutions $N$ must be minimized to ensure an improved accuracy as mentioned earlier, if the time interval between the teeth of the ring gear is counted in terms of a clock pulse (frequency $F_1$), its value is proportional to $1/N$. However, in view of the fact that the actual time interval between the teeth varies somewhat for different teeth of the ring gear due to the machining thereof and in consideration of the frequency $F_1$ of the clock pulses from the frequency converting circuit 13, a time interval $T$ (sec.) for every eight teeth of the ring gear is measured. Accordingly, in the embodiment of FIG. 1, the output waveform of the reshaping circuit 4 has the waveform $a$ of FIG. 6 corresponding to the number of teeth in the ring gear and a single rectangular waveform $b$ as shown in FIG. 6 is therefore produced from the frequency dividing circuit 9 for every eight teeth of the ring gear. On the other hand, if the output frequency of the frequency converting circuit 13 is $F_1$, then the output of the AND circuit 15 has the waveform $c$ shown in FIG. 6.

Further, from the output waveform $b$ of the frequency dividing circuit 9 which is shown in FIG. 6, the signal generating circuit 10 comprised of three delay circuits chiefly constituted for example of two TI SN 7400 and two logical circuits constituted for example of the TI SN 7400 generates the reset signal $e$ for the counter 16 which is shown in FIG. 6 and the temporary storage signal $d$ for the latch circuit 17 which is shown in FIG. 6. The output signals of the AND circuit 15 are counted by the counter 16 and the output data of the counter 16 is entered into the latch circuit 17. If $T$ represents the time interval for every eight teeth of the ring gear and $t_1$ represents the period of the clock pulse having the frequency $F_1$, then the value $\eta$ of the output data is given as $$\eta = T/t_1 \qquad (2)$$

Since $$T = \frac{1}{\frac{115}{60} \times N} \times 8, \text{ if } \frac{60}{115} = K_1,$$

we obtain $$\begin{aligned}\eta &= K_1 \times \frac{1}{N} \times \frac{1}{t_1} \\ &= K_1 \times F_1 \times \frac{1}{N}\end{aligned} \qquad (3)$$

Thereafter, the retard angle $\alpha_1$ is read out by designating, in accordance with the value of the engine revolutions, the address of the revolution read-only memory 7 into which the value of the desired advance angle $\theta_1$ converted into the retard angle $\alpha_1$ has been programmed. In this embodiment, the retard angle $\alpha_1$ is represented by a 7-bit signal. On the other hand, the DC signal from the intake manifold vacuum sensor 2 is converted into a digital signal through the conventional A - D converter 5 and the retard angle $\alpha_2$ is read out by designating, in accordance with the value of this digital signal, the address of the vacuum read-only memory 8 into which the value of the desired advance angle $\theta_2$ converted into the retard angle $\alpha_2$ has been programmed. In this embodiment, the retard angle $\alpha_2$ is represented by a 5-bit signal. If, in FIG. 3, the value of the angle $\beta$ is 50°, the revolution advance angle is 35° and the vacuum advance angle is 15°, then, in FIGS. 4a and 4b, the values of the retard angles $\alpha_1$ and $\alpha_2$ are given as $\alpha_1 = 35° - \theta_1$ and $\alpha_2 = 15° - \theta_2$. Further, since the total advance angle $\theta$ is given as $\theta = \theta_1 + \theta_2$, the adding circuit 11 of FIG. 1 produces the sum of the retard angles $\alpha_1$ and $\alpha_2$ and the total retard angle $\alpha$ in binary code form is applied as an input data to the frequency converting circuit 13. The frequency converting circuit 13 is comprised for example of two TI SN 7497 connected in cascade and its output is applied, after the frequency division by a factor of 4 in the TI SN 74161 synchronous counter, to the AND circuit 15.

On the other hand, the output of the oscillator circuit 12 employing the crystal resonator to oscillate at a frequency $F_i$ of 27 MHz is applied to the clock terminal of the TI SN 7497 in the frequency converting circuit 13 and the binary code data from the adding circuit 11 is applied to the input terminal of this TI SN 7497. In this case, since there exists between an input frequency fin and an output frequency fout of the TI SN 7497 a relationship $$fout = \frac{fin}{64},$$

an output frequency $F_o$ of the two SN 7497's connected in cascade is given as $$F_o = \frac{\alpha}{64 \times 64} \times F_i$$

where $\alpha = a \times 2^0 + b \times 2^1 + c \times 2^2 + d \times 2^3 + e \times 2^4 + f \times 2^5 + A \times 2^6 + B \times 2^7 + C \times 2^8 + D \times 2^9 + E \times 2^{10} + F \times 2^{11}$.

Here, $a, b, c, d, e, f, A, B, C, D, E$ and $F$ designate the binary code data from the adding circuit 11.

Consequently, the output frequency $F_1$ of the frequency converting circuit 13 is given as $$F_1 = \frac{1}{4} F_o = \frac{1}{4} \times \frac{\alpha}{64 \times 64} \times F_i$$

Therefore, if $$\frac{F_i}{4 \times 64 \times 64} = K_2,$$

then we obtain $$F_1 = K_2 \times \alpha \qquad (4)$$

Here, the output frequency $F_0$ is divided by a factor of 4 to produce equally spaced pulses.

It follows from the foregoing that the output frequency $F_1$ is proportional to the binary code data $\alpha$ from the adding circuit 11.

Figure 7:
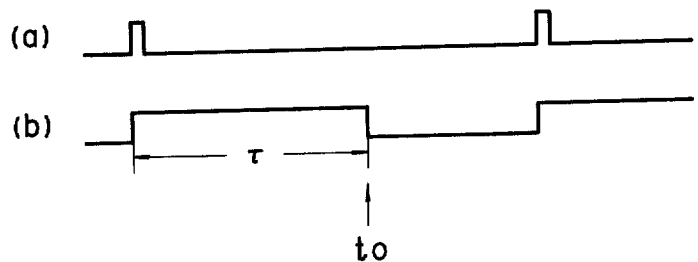
FIG. 7: a shows the output waveform of a reshaping circuit 6, and b shows the output waveform of a comparator 19 in the embodiment of FIG. 1.

On the other hand, the output signal of the reference angular position sensor 3 is reshaped by the reshaping circuit 6 into a rectangular wave and it is applied to the reset terminal of the counter 18. The waveform $a$ of this rectangular wave is shown in FIG. 7. Namely, FIG. 7 shows the output waveform $a$ of the reshaping circuit 6 and this output pulse indicative of the reference angular position is utilized to reset the counter 18. The frequency converting circuit 14 is comprised of a single TI SN 7497 and its output frequency $F_2$ is a fixed predetermined frequency given as $$F_2 = \frac{M}{64} \times F_i,$$

where $M = a' \times 2^0 + b' \times 2_1 + c' \times 2^2 + d' \times 2^3 + e' \times 2^4 + f' \times 2^5$.

The comparator 19 receives the output data of the latch circuit 17 and the output data of the counter 18 is also applied to the comparator 19, whereby when the count of the reset counter 18 becomes equal to or greater than the output data $\gamma_1$ stored in the latch circuit 17 and when the time duration $\tau$ expires, the comparator 19 generates an output signal. The waveform $b$ of this output signal is shown in FIG. 7. Accordingly, the time duration $\tau$ is given as $$\tau = \eta \times t_2$$

where $$T_2 = \frac{1}{F_2}$$

Substituting equation (3) into the above gives $$\tau = K_1 \times F_1 \times \frac{1}{N} \times t_2$$

$$= K_1 \times F_1 \times \frac{1}{N} \times \frac{1}{F_2}.$$

Further substituting equation (4) into the above gives $$\tau = \frac{K_2 \alpha}{F_2} \times K_1 \times \frac{1}{N}$$

$$= K_3 \times \alpha \times \frac{1}{N} \qquad (5)$$

where $$K_3 = \frac{60}{115} \times \frac{1}{4 \times 64 \times 64} \times \frac{F_1}{F_2} = \frac{K_2 K_1}{F_2}.$$

Therefore, the output time duration $\tau$ of the comparator 19 of FIG. 1 satisfies the above-mentioned equation (1). Namely, a time $t_0$ at which the time duration $\tau$ goes to zero indicates the desired ignition point.

It will be seen from the foregoing description that in the first embodiment of this invention, while in fact the computation of equation (1) is effected, it requires only the time for measurement and there is no need for any computing time. Further, as regards the operating accuracy, the higher the output frequencies $F_1$ and $F_2$ of the frequency converting circuits 13 and 14, the better the accuracy, that is, the accuracy may be improved in proportion to increase in the frequency of the oscillator circuit 12.

Furthermore, since the output frequency $F_2$ of the frequency converting circuit 14 is given as $$F_2 = \frac{M}{64} \times F_i,$$

by substituting the initial setting according to the above-described equation (5), it is possible to find the proportionality constant $K_3$ and hence the output frequency $F_2$ of the frequency converting circuit 14 is determined. In this way, it is possible to determine the above-mentioned binary code preset values $a', b', c', d', e'$ and $f'$ of the frequency converting circuit 14 which are to be preliminarily programmed.

As regards the question of the response characteristic, the data designated as $\eta$ is applied to the latch circuit 17. In other words, the data introduced into the comparator 19 for comparison is measured for every eight teeth of the ring gear and the data is stored in units of a tooth. Therefore, the data obtained no earlier than the lapse of the time for nine teeth of the ring gear at the maximum $$\left( \frac{60 \times 9}{N \times 115} \right)$$

or the data less than about 5/N [sec.] old is available and this represents substantially the up-to-minitute data. In other words, a very high response speed is ensured. The response characteristic is further improved by the fact that no computing time is required.

The principal individual circuits used in the above-described embodiment including the revolution and vacuum read-only memories 7 and 8, the adding circuit 11, the frequency converting circuits 13 and 14, the counters 16 and 18, the latch circuit 17 and the comparator 19 have been disclosed in the "TTL Application Manual" distributed in Japan on Sept. 15, 1972 by Texas Instruments, Inc. Asia Ltd.

Further, while, in the above-described first embodiment, only the two control elements, i.e., the revolution control element and the vacuum control element are included as the read-only memories 7 and 8, other memories programmed in accordance with the engine cooling water temperatures, exhaust gas emissions, etc., may be readily added as additional control elements if they are arranged so that their values are applied to the adding circuit 11.

Furthermore, while, in the first embodiment, the programs of the retard angles $\alpha_1$ and $\alpha_2$ are respectively stored in the read-only memories 7 and 8, it is of course possible to use an arrangement in which the desired advance angles $\theta_1$ and $\theta_2$ are respectively stored in the read-only memories 7 and 8 and the value of the reference angular position is preliminarily stored in a substracting circuit, whereby the sum of the desired advance angles $\theta_1$ and $\theta_2$ or the value of the total advance angle is substracted from the value of the reference angular position to thereby accomplish the similar function as the first embodiment.

Figure 8:
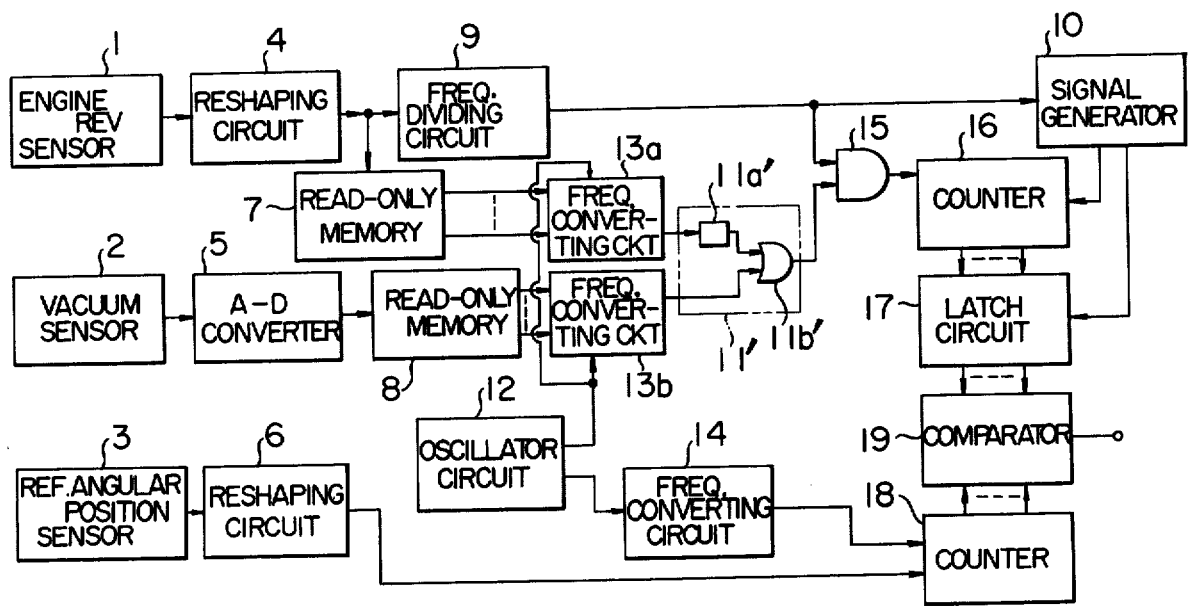
Fig. 8 is a block diagram showing a second embodiment of the invention.

Still furthermore, while, in the first embodiment, the outputs of the read-only memories 7 and 8 are applied to the adding circuit 11 whose output is then frequency converted by the frequency converting circuit 13, it is of course possible to accomplish the similar function as the above-described first embodiment by the arrangement of a second embodiment shown in FIG. 8 in which the outputs of the read-only memories 7 and 8 are respectively applied to frequency converting circuits 13a and 13b and the output frequencies of the frequency converting circuits 13a and 13b are added as such in an adder 11'. In the second embodiment of FIG. 8, the adder 11' is comprised of a delay circuit 11a' for delaying the output of the frequency converting circuit 13a and an OR circuit 11b' for producing the sum of the outputs of the delay circuit 11a' and the other frequency converting circuit 13b.

It should be apparent to those skilled in the art that the advance angles in the present invention include as negative advance angles the ignition points after the top dead center which are provided for exhaust emission control purposes.

The advantages of the embodiments of the circuit according to the invention may be summarized as follows:

1. Due to all the control signals being in digital form, a stable operation is ensured against changes in external conditions such as variations of the power supply voltage and of ambient temperature.

2. Due to the entire circuitry being constructed with digital operational elements, it is possible to reduce manufacturing costs and standardize the manufacturing process through the use of integrated circuits.

3. If it is desired to alter the design of the characteristic for different purposes of the engine or for different types of engines, any desired characteristic may be easily obtained by simply altering the program of the read-only memory or memories.

4. Since the output frequency of a frequency converting circuit for generating a frequency which varies with a predetermined functional relationship in accordance with the value of a total advance angle including an engine revolution advance angle, an intake manifold vacuum advance angle, an engine cooling water temperature advance angle, an exhaust gas emission advance angle, etc., is gated by a value inversely proportional to the engine revolutions and its value is counted by a counter, an improved response characteristic is ensured, and moreover the absence of such complicate computing circuitry as used in table type electronic computers permits the use of circuitry which is simple for its accuracy.

5. The circuit of this invention can be readily incorporated in any of the presently available engines without any modification of the engine body excepting that the reference angular position detector is mounted on the crankshaft.

We claim:

1. An electronic ignition timing control system for an internal combustion engine comprising:
   revolution detecting means for detecting the number of revolutions per unit time of an internal combustion engine in digital value;
   reference angular position detecting means for detecting a reference angular position of said engine to generate a reference angular position signal;
   a revolution memory circuit connected to said revolution detecting means whereby in response to a revolution signal from said revolution detecting means, a revolution advance angle is read out, as a revolution retard angle from the reference angular position of said engine, from a predetermined ignition timing characteristic program;
   advance angle-frequency converting means connected to said revolution memory circuit for converting said revolution retard angle into a frequency by generating the frequency which varies with a predetermined functional relationship in accordance with an output signal read out from said revolution memory circuit;
   a gating circuit connected to said advance angle-frequency converting means and said revolution detecting means and adapted to be opened to pass the output frequency of said advance angle-frequency converting means therethrough while a predetermined number of digital signals is generated from said revolution detecting means to thereby inversely proportion said frequency with respect to the number of revolutions per unit time of said engine;

a counter connected to said gating circuit for outputting a digital value corresponding to a delay time from a moment at which a rotation of said engine passes said reference angular position by counting the output frequency of said gating circuit each time said gating circuit is opened; and ignition timing signal generating means connected to said reference angular position detecting means and said counter for generating an ignition timing signal after a period of time corresponding to the count of said counter from a moment at which the reference angular position signal is generated in said reference angular position detecting means.

2. A system according to claim 1, further comprising load detecting means for detecting the load of said engine in digital value, and a load memory circuit connected to said load detecting means whereby in response to a load signal from said load detecting means a load advance angle is read out, as a load retard angle from the reference angular position of said engine, from a predetermined ignition timing characteristic program, wherein said advance angle-frequency converting means comprises an adding circuit connected at least to said revolution memory circuit and said load memory circuit for adding said revolution and load retard angles and converting said revolution and load retard angles into a total retard angle from the reference angular position of said engine, an oscillator circuit for oscillating at a predetermined frequency, and a frequency converting circuit connected to said oscillator circuit and said adding circuit whereby the output frequency of said oscillator circuit is varied with a predetermined functional relationship in accordance with said total retard angle from said adding circuit to generate an output frequency.

3. A system according to claim 2, wherein said load detecting means comprises vacuum detecting means for detecting in digital value the vacuum within the intake manifold of said engine.

4. A system according to claim 1, further comprising load detecting means for detecting the load of said engine in digital value, and a load memory circuit connected to said load detecting means whereby in response to a load signal from said load detecting means a load advance angle is read out, as a load retard angle from the reference angular position of said engine, from a predetermined ignition timing characteristic program, wherein said advance angle-frequency converting means comprises an oscillator circuit for oscillating at a predetermined frequency, a first frequency converting circuit connected to said oscillator circuit and said revolution memory circuit for converting said revolution retard angle into a first output frequency which is varied with a predetermined functional relationship in accordance with an output signal read out from said revolution memory circuit, a second frequency converting circuit connected to said oscillator circuit and said load memory circuit for converting said load retard angle into a second output frequency which is varied with a predetermined functional relationship in accordance with an output signal read out from said load memory circuit, and an adder connected at least to said first and second frequency converting circuits to add at least the output frequencies of said first and second frequency converting circuits together.

5. A system according to claim 4, wherein said load detecting means comprises vacuum detecting means for detecting in digital value the vacuum within the intake manifold of said engine.

6. A system according to claim 1, wherein said ignition timing signal generating means comprises a reference frequency generating circuit for generating clock pulses having a predetermined frequency, a counter connected to said reference frequency generating circuit and said reference angular position detecting means and adapted to be reset by the reference angular position signal from said reference angular position detecting means to count the number of the clock pulses from said reference frequency generating circuit, a temporary storage circuit connected to said gate output counting counter for temporarily storing the count data thereof until the arrival of the next count data, and a comparator circuit connected to said temporary storage circuit and said clock pulse counting counter for generating an ignition timing signal when the value of the count data from said clock pulse counting counter becomes equal to the value of the output data of said temporary storage circuit.

7. A system according to claim 2, wherein said ignition timing signal generating means comprises a second frequency converting circuit connected to said oscillator circuit for converting the output of said oscillator circuit into clock pulses having a predetermined frequency, a counter connected to said second frequency converting circuit and said reference angular position detecting means and adapted to be reset by the reference angular position signal from said reference angular position detecting means to count the clock pulses from said second frequency converting circuit, a temporary storage circuit connected to said gate output counting counter for temporarily storing the count data thereof until the arrival of the next count data, and a comparator circuit connected to said temporary storage circuit and said clock pulse counting counter for generating an ignition timing signal when the count data of said clock pulse counting counter becomes equal in value to the output data of said temporary storage circuit.

8. A system according to claim 4, wherein said ignition timing signal generating means comprises a second frequency converting circuit connected to said oscillator circuit for converting the output of said oscillator circuit into clock pulses having a predetermined frequency, a counter connected to said second frequency converting circuit and said reference angular position detecting means and adapted to be reset by the reference angular position signal from said reference angular position detecting means to count the clock pulses from said second frequency converting circuit, a temporary storage circuit connected to said gate output counting counter for temporarily storing the count data thereof until the arrival of the next count data, and a comparator circuit connected to said temporary storage circuit and said clock pulse counting counter for generating an ignition timing signal when the count data of said clock pulse counting counter becomes equal in value to the output data of said temporary storage circuit.

* * * * *